United States Patent [19]
D'Asaro

[11] 3,740,661
[45] June 19, 1973

[54] MINOR LOBE SUPPRESSION IN SEMICONDUCTOR INJECTION LASERS

[75] Inventor: Lucian A. D'Asaro, Madison, N.J.

[73] Assignee: Bell Telephone Laboratories, Incorporated, Murray Hill, N.J.

[22] Filed: June 6, 1969

[21] Appl. No.: 831,003

[52] U.S. Cl..... 331/94.5 C, 317/235 R, 331/94.5 H
[51] Int. Cl............................................. H01s 3/00
[58] Field of Search..................... 331/94.5; 317/235

[56] References Cited
UNITED STATES PATENTS
3,576,501   4/1971   Deutsch........................... 331/94.5
3,456,209   7/1969   Diemer............................. 331/94.5

OTHER PUBLICATIONS
Dyment: "Hermite–Gaussian Mode Patterns in Ga As Junction Lasers," Applied Physics Letters, Vol. 10, pp. 84–86, Feb. 1, 1967.

Primary Examiner—Edward S. Bauer
Attorney—W. L. Keefauver and Arthur J. Torsiglieri

[57] ABSTRACT

The minor lobes present in the intensity profile of a semiconductor injection laser are suppressed by an absorbing region located at and beyond the plane of minimum intensity between the major lobe and the first minor lobe. The absorbing region illustratively comprises an $n^+$-region located in the n-side of the p-n junction or alternatively a narrower band gap region located in the n-side. The use of such absorbing regions results in substantially a Gaussian intensity profile.

14 Claims, 4 Drawing Figures

PATENTED JUN 19 1973   3,740,661
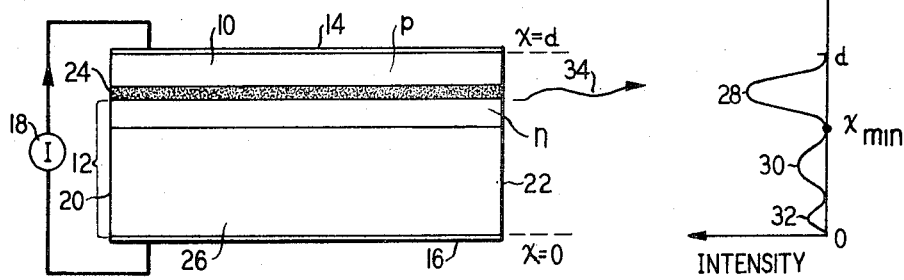
FIG. 1A
FIG. 1B
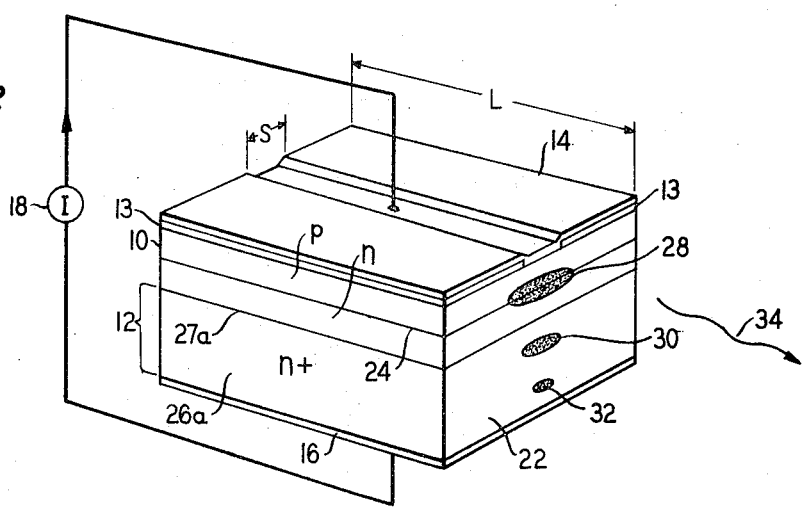
FIG. 2
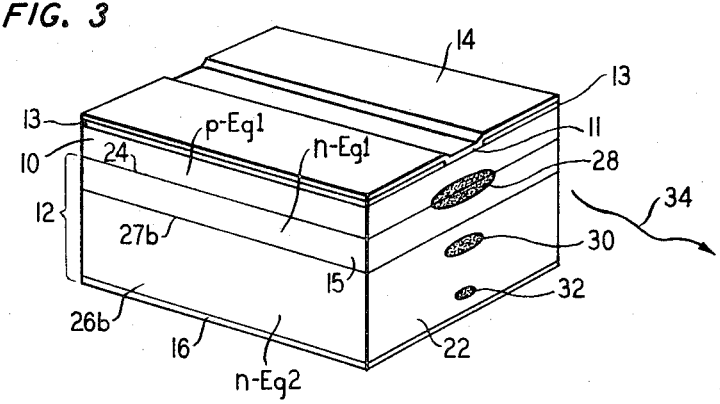
FIG. 3
INVENTOR
L. A. D'ASARO
BY
A. J. Torsiglieri
ATTORNEY

MINOR LOBE SUPPRESSION IN SEMICONDUCTOR INJECTION LASERS

BACKGROUND OF THE INVENTION

This invention relates to semiconductor injection lasers and, more particularly, to the suppression of minor intensity lobes in such lasers.

In conventional injection lasers comprising a p-n junction formed in a single crystal, such as GaAs, radiative recombination between holes and electrons occurs in the junction region when the crystal is forward biased. The junction region functions as a waveguide causing stimulated coherent radiation to be emitted primarily in the plane of the junction. All of the radiation so generated, however, is not confined to the junction plane. Because the n-side of the junction is relatively transparent to optical radiation, some of the photons generated by the recombination mechanism travel into the n-region and undergo an optical interference phenomenon which produces secondary intensity peaks, termed minor lobes. The existence of such minor lobes is disadvantageous for several reasons: first, the coupling of laser radiation into other optical elements is facilitated when the radiation profile is Gaussian, but is considerably more difficult and less efficient where the profile includes minor lobes; secondly, to design an optical transmission system for the lowest loss, it is desirable to have a single, well-defined intensity mode — preferably a Gaussian mode.

Prior art attempts to suppress the minor lobes in injection lasers are directed primarily to means located externally to the semiconductor crystal. Thus, for example, it has been proposed to apply a lossy coating to the laser output mirror in the region of the minor lobes. Alternatively, it has been suggested to position an optical slit in the image plane of a microscope objective. See, for example, an article by T. H. Zachos, *Applied Physics Letters*, 12, 318 (1968) and an article by J. C. Dyment and T. H. Zachos, *Journal of Applied Physics*, 39, 2923 (1868). Each of these proposals suffers from one or more disadvantages. More particularly, the modification of the laser mirrors requires new mirror preparation techniques, whereas the use of an external slit is cumbersome, expensive and sacrifices the compactness inherent in semiconductor devices.

SUMMARY OF THE INVENTION

The present invention overcomes the aforementioned disadvantages by the use of internal means for the suppression of minor intensity lobes in semiconductor lasers. The internal means comprise an optical absorbing region located in the n-region of the crystal body at and beyond the plane of minimum intensity between the major lobe and the first minor lobe. The absorbing region in one illustrative embodiment comprises an $n^+$-region in the n-side of the junction, and in another embodiment comprises a narrower band gap region also located in the n-side. Increased absorption in the $n^+$-region is due to free carriers whereas in the narrower band gap region it is due to band-to-band transitions. Alternatively, a combination of these embodiments may be utilized simultaneously to achieve still greater attenuation of the minor lobes. The resultant far-field pattern of the remaining major lobe consequently has the desired Gaussian intensity profile, achieved advantageously without the use of cumbersome external apparatus and without the need for new mirror fabrication techniques. As will be described more fully hereinafter, the fabrication of the absorbing region in accordance with the invention may readily be accomplished by techniques well known in the art.

BRIEF DESCRIPTION OF THE DRAWINGS

FIG. 1A is a schematic side view of a conventional injection laser;

FIG. 1B is a graph showing the major and minor lobes in the intensity profile of a conventional semiconductor injection laser;

FIG. 2 is a pictorial schematic of one illustrative embodiment of the invention; and FIG. 3 is a pictorial schematic of a second illustrative embodiment of the invention.

DETAILED DESCRIPTION

Turning now to FIG. 1A, there is shown a semiconductor injection laser comprising a crystal body having p- and n-regions 10 and 12, respectively, separated by a junction region 24. Contacts 14 and 16 are deposited on opposite surfaces of p- and n-regions 10 and 12, respectively, and are connected to energy source 18 which forward-biases p-n junction 24 and provides current in excess of the lasing threshold. An optical-cavity resonator for sustaining stimulated coherent radiation is formed by parallel surfaces 20 and 22, which are polished or cleaved to provide high reflectivity at the operating wavelength of the laser. By techniques well known in the art, the optical reflectivity of surfaces 20 and 22 may be enhanced by the addition thereto of a reflective coating such as silver. Surface 22, for example, is made partially transmissive to permit egress of a portion 34 of the coherent radiation from the resonator.

In operation, carriers are injected into the junction region 24 and undergo radiative recombination, producing photons which travel primarily in the junction plane. These photons have a spatial distribution characterized by major intensity lobe 28, as shown in FIG. 1B. As previously mentioned, however, although the junction region 24 acts like a waveguide, not all of the photons are confined thereto. Some of the photons propagate into the n-region where optical interference occurs resulting in the creation of minor intensity lobes such as 30 and 32 shown in FIG. 1B. As is well known in the art, these major and minor lobes characterize, respectively, fundamental and higher order transverse modes perpendicular to the plane of junction 24. The differing velocity of the photons can, in a very simplistic theory, be attributed to the existence of band gap narrowing in the p- and n-regions proper. It is well known that the index of refraction of a material is related to its band gap and that in turn the velocity of propagation of light through such a material is related to its index of refraction. Thus, a gradient of index of refraction (i.e., a waveguide effect) causes dispersion in the photons generated in the junction region and results in the aforementioned interference phenomenon. This simplistic theory is presented only to provide a better understanding of the operation of the invention and is not intended to be a limitation upon its scope. In a more rigorous analysis by T. H. Zachos in *Applied Physics Letters*, 12, 318 (1968), calculated solutions of the waveguide problem show that such interference fringes will be present and these fringes have actually been observed experimentally.

It is, therefore, an object of the present invention to absorb such photons propagating in the n-region by means of an absorbing region 26 located at and beyond the plane of minimum intensity ($x_{min}$, FIG. 1B) between the major lobe 28 and the first minor lobe 30. The absorbing region may be either an $n^+$-region located in n-side of the p-n junction (FIG. 2) or a narrower band gap material also located in the n-side (FIG. 3), or both. To this end the thickness of the n-region is important, for it is undesirable that this region be so thick that $x_{min}$ occurs within the n-region. Otherwise, the first minor lobe and perhaps other minor lobes would not be attenuated. Thus, while the n-region is illustratively 2–3μm thick, it is generally not as great as 20–30μm thick. The numerical designations of FIGS. 1A and 1B have been retained in FIGS. 2 and 3, where appropriate, to facilitate comparison.

$n^+$-ABSORBING REGION

In FIG. 2 there is shown an injection laser producing stimulated coherent radiation 34 through output mirror 22, which is typically partially transmissive. On the surface of mirror 22 are indicated shaded areas 28, 30, and 32 corresponding to the major, first minor and second minor intensity lobes present in a conventional injection laser. The transverse mode distribution is restricted by the use of a stripe contact 14 contacting p-region 10 in an elongated region 11 but being elsewhere separated from p-region 10 by insulators 13. Such stripe contacts are the subject matter of U.S. Pat. No. 3,363,195 of R. A. Furnange et al. filed on July 1, 1963, issued on Jan. 9, 1968 and assigned to applicants' assignee. This structure is also disclosed in the Dyment et al. article, supra.

In the embodiment of FIG. 2, the absorbing region 26a comprises an $n^+$-region formed by increasing the doping in a portion of the n-region 12 forming a n-$n^+$ junction 27a between the n and $n^+$ regions. Because free carrier absorption increases with doping and is dominant in the $n^+$-region at the laser wavelength, the minor lobes 30 and 32 (and any others which may be present) will be attenuated. In a typical embodiment of a GaAs laser, the p-region 10 is about 2.5μm thick, the stripe contact width $s = 12.5$μm and length $L = 380$μm, the insulator 13 is $SiO_2$, the n-$n^+$ junction 27a is 2 to 3μm from the p-n junction 24, the n-doping would be about $3 \times 10^{18}$ electrons/cm$^3$ (a resistivity of $7 \times 10^{-4}$ ohm-cm), giving an approximate attenuation coefficient of 10 cm$^{-1}$, while the $n^+$ doping would be about $7 \times 10^{18}$ electrons/cm$^3$ (a resistivity of $4.5 \times 10^{-4}$ ohm-cm), giving an attenuation coefficient of 40 cm$^{-1}$. These values of attenuation are for a typical photon energy of 1.35 eV at 300°K and may be obtained from an article by D. E. Hill in *Physical Review*, 133, A868 (1964).

Narrow Band Gap Absorbing Region

A Gaussian profile in the far-field pattern may also be achieved in accordance with a second embodiment of the invention, shown in FIG. 3, where the n-region 12 is fabricated from a pair of semiconductor materials 15 and 26b having, respectively, different band gaps $E_{g1}$ and $E_{g2}$ such that $E_{g2}$ is less than $E_{g1}$, thus forming a phase boundary 27b between the different n-regions. The narrower band gap n-region 26b is the absorbing region. The p-region 10, on the other hand, has substantially the same band gap $E_{g1}$ as the n-region 15.

Typically, the n-region 26b is fabricated from a mixed crystal, for example, $Ga_xIn_{1-x}As$, while the p- and n-regions 10 and 15 comprise GaAs. Alternatively, the n-region 26b could be formed from GaAs and the p- and n-regions 10 and 15 could comprise $Ga_xAl_{1-x}As$. In such mixed crystals $x$ illustratively ranges from 0.1 to 0.5. Other combinations of large and small band gap materials are also suitable. Standard diffusion techniques may be utilized in the fabrication or, alternatively, an epitaxial tipping technique as disclosed in copending application of M. B. Panish and S. Sumski, Ser. No. 786,226 filed Dec. 23, 1968, now U.S. Pat. No. 3,560,276 issued on Feb. 2, 1971 and assigned to applicant's assignee, may be utilized.

The required difference in band gap, $E_{g1}-E_{g2}$, may be relatively small since the attenuation coefficient increases rapidly with energy near the band edge. For example, if $E_{g1}-E_{g2}$ is 100 meV, attenuation in the n-region 26b would be about 10 times larger than the attenuation in n-region 15. Of course, the effect of still larger differences in band gap will be to further increase the attenuation in n-region 26b. At room temperature, the band gap of GaAs is about 1.4 eV, whereas, as $x$ ranges from 0 to 1, the band gaps of $Ga_xAl_{1-x}As$ and $Ga_xIn_{1-x}As$ range, respectively from about 1.4 eV to 1.9 eV and from about 1.4 eV to 0.45 eV.

It is understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, the simultaneous use of increased free carrier absorption in an $n^+$ absorbing region and band-to-band absorption in a reduced band gap region produces still greater attenuation of the minor lobes than can be obtained with the use of either separately. Additionally, if cw operation is desired, a heat sink may be thermally coupled to the laser device, or, if low temperature operation is desired, cooling apparatus may be utilized — both techniques are well known in the art and are omitted here for the purposes of clarity and simplicity.

What is claimed is:

1. A semiconductor injection laser device comprising a region of first conductivity-type material, a region of second conductivity-type material contiguous to said region of first conductivity-type material and forming a planar p-n junction therebetween, said device having a pair of oppositely facing reflecting surfaces forming an optical cavity resonator for sustaining oscillations of coherent radiation, means for generating stimulated coherent radiation in a major intensity lobe comprising means for forward biasing said junction and for applying thereto current in excess of the lasing threshold, means for extracting a portion of said radiation from said resonator, said device disadvantageously tending to produce radiation in at least a first minor lobe, said major and minor lobes constituting transverse modes perpendicular to the plane of said junction, and means for attenuating radiation in said minor lobe characterized in that said attenuating means comprises an absorbing region located interior to said device at and beyond the plane between said major and minor lobes, said minor lobes normally exist in said second conductivity-type region and said absorbing region comprises a region of the same conductivity type as said second region, but of smaller bandgap, thereby forming a phase boundary between said second region and said absorbing region.

2. The laser device of claim 1 wherein said absorbing region is located at and beyond the plane of minimum intensity between said major lobe and the first minor lobe.

3. The laser device of claim 1 wherein said first and second regions comprise, respectively, p- and n-type regions of GaAs, and said absorbing region comprises an n-type mixed crystal.

4. The laser device of claim 3 wherein said mixed crystal comprises $Ga_xIn_{1-x}As$.

5. The laser device of claim 1 wherein said first and second regions comprise, respectively, n- and p-type regions of a mixed crystal and said absorbing region comprises an n-region of GaAs.

6. The laser device of claim 5 wherein said mixed crystal comprises $Ga_xAl_{1-x}As$.

7. The laser device of claim 1 wherein said absorbing region comprises a region of the same conductivity type as that of said region in which minor lobes normally exist, but being more heavily doped than said minor lobe region, thereby to define an interface therebetween, and a narrow band gap region located at and beyond said interface and being of same conductivity type as said minor lobe region, but of smaller band gap.

8. In a semiconductor injection laser, an active medium comprising a region of first conductivity-type material, a region of second conductivity-type material contiguous to said first region and forming a planar p-n junction therebetween, said medium generating, in response to forward bias and the application of current in excess of the lasing threshold, stimulated coherent radiation in a major intensity lobe and disadvantageously tending to produce radiation in at least one of said regions in at least a first minor lobe, said major and minor lobes constituting transverse modes perpendicular to the plane of said junction, and means for attenuating radiation in said minor lobes characterized in that said attenuating means comprises an absorbing region located interior to said medium at and beyond the plane between said major and minor lobes, said minor lobes normally exist in said second conductivity-type region and said absorbing region comprises a region of the same conductivity type as said second region, but of smaller bandgap, thereby forming a phase boundary between said second region and said absorbing region.

9. The active medium of claim 8 wherein said absorbing region is located at and beyond the plane of minimum intensity between said major lobe and said first minor lobe.

10. The active medium of claim 8 wherein said first and second regions comprise, respectively, p- and n-type regions of GaAs, and said absorbing region comprises an n-type mixed crystal.

11. The active medium of claim 10 wherein said mixed crystal comprises $Ga_xIn_{1-x}As$.

12. The active medium of claim 8 wherein said first and second regions comprise, respectively, n- and p-type regions of a mixed crystal and said absorbing region comprises an n-region of GaAs.

13. The active medium of claim 12 wherein said mixed crystal comprises $Ga_xAl_{1-x}As$.

14. The active medium of claim 8 wherein said absorbing region comprises a region of the same conductivity type as that of said region in which minor lobes normally exist, but being more heavily doped than said minor lobe region, thereby to define an interface therebetween, and a narrow band gap region located at and beyond said interface and being of the same conductivity type as said minor lobe region, but of smaller band gap.

* * * * *